Jan. 17, 1939.    J. A. SAFFIR    2,144,392
DENTAL X-RAY FILM PACKAGE
Filed Jan. 14, 1938

Inventor.
Jacob A. Saffir

Patented Jan. 17, 1939

2,144,392

UNITED STATES PATENT OFFICE 2,144,392

DENTAL X-RAY FILM PACKAGE

Jacob A. Saffir, Chicago, Ill., assignor to Jacob William Frankel, Chicago, Ill.

Application January 14, 1938, Serial No. 185,024

3 Claims. (Cl. 250—69)

This invention relates to X-ray film packages, and more particularly to dental X-ray film packages of wafer like proportion, thin enough to be insertable into the oral cavity for taking X-ray pictures of that region.

It is one of the objects of this invention to produce a thinner, more flexible, and a simpler package than what was possible heretofore.

Dental X-ray films are packed flat and it is understandable by any person familiar with the art that in that condition there are numerous instances where they cannot be used without altering their form, and, before placing the said film in picture taking position, the dentist or operator must first bend or flex it into a shape suitable for X-raying the area where he is working. The more flexible a package is, the greater its utility to the dentist and the easier it is to use.

There has, furthermore, recently been introduced an X-ray film package capable of exposure on both of its flat sides and this type depends, for its success, on a radio opaque member which is employed in the assembly of this package to keep the X-rays from reaching the side which is the opposite of the one being exposed. This requires generally a rather heavy piece of lead, still further handicapping the utility of the package.

All dental X-ray films generally contain a strip of lead, which, as is well known to any one familiar in the art, is almost indispensable. But this lead cannot be allowed to come in contact with the sensitive film or emulsion as injury to the delicate emulsion of film may result. It has, therefore, been the custom to place a piece of paper to separate the lead from the film. It can be seen, therefore, that in a package having two films adjacent to the lead, it has, then, been necessary to add two protective pieces of paper, which tends to still more burden the thickness of the package.

This invention does away with these pieces of paper and with the attendant disadvantages inherent to the added bulk occasioned by these pieces of paper.

This invention proposes to use, in these film packages a sheet of lead foil that has been lacquered and thus has its surface rendered suitable for contact with the X-ray film without the interposition of a sheet of paper. In this specification the terms lacquered or varnished or lacquer-varnished are equivalent.

Thus is removed a very considerable portion of the bulk of the film package (bulk being a detriment to its comfort in the mouth of a patient), and thus is also simplified the packaging of these films, due to the fewer number of parts required to assemble a unit.

In hand assembled film packages—and a considerable number of film packages are still hand made—an entire operation is eliminated. Where double exposable films are made, two operations are eliminated. In machine made films the machine is simplified, for with less layers to fill, fewer parts are required and there is less likelihood of jamming.

Even more important to the X-ray technician and dentist than the simplification of the machine is the resulting greater convenience in opening and handling such a package in the dark room and the consequent elimination of one of the unavoidable dark room mistakes that are so annoying and costly.

It is the common experience of nearly every one who develops X-rays in a dark room to occasionally mount a piece of the protective paper on the X-ray holder and to discard the film itself. This piece of paper is then put through the various stages of developing and fixing. Only after the films are ready to be taken out of the dark room is such an error apprehended, and by that time it is too late to do anything else but retake the X-ray picture, a procedure which is annoying to the patient and an added expense and waste of time to the dentist or X-ray technician.

By eliminating these protective slips of paper through the use of the invention disclosed in this specification, such an error naturally cannot occur.

In all cases, the use of applicant's invention saves time and the necessity for handling more parts of the film package in the dark room than are absolutely necessary for perfect results.

Inasmuch as the thickness of a layer of lacquer is negligible, it can readily be seen that, in addition to the film package having the added advantage of greater thinness, it has, what is perhaps even more important, the greater possibility for flexibility, and is therefore much more adaptable in the mouth and more useful.

The attainment of the above, and further objects of the present invention will be apparent from the following specification when taken in conjunction with the accompanying drawing forming a part thereof.

Figure 1:
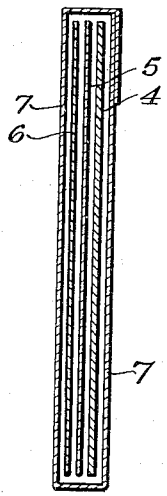
Figure 1 is a diagrammatic sectional view through a single exposable film package constructed in accordance with the present invention, the various wrappings of the film having been expanded transversely to facilitate illustration.

Reference may now be had to Figure 1. This figure shows a dental X-ray film package of wafer thickness suitable for insertion into the mouth for taking pictures of the teeth and surrounding structures. This package comprises a piece of X-ray film 5, with a radio opaque backing of lead 4, that has a coat of lacquer, on the side proximating the film. In front of the film is a sheet of paper 6, and outside of that, any outer wrapping 7, which is permeable to X-rays but not to light; 7 forming an outer enclosing envelope.

Figure 2:
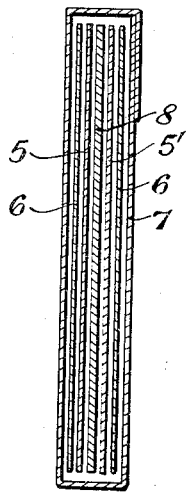
Figure 2 is a diagrammatic sectional view through exposable film package constructed in accordance with the present invention, the various wrappings of the film having been expanded transversely to facilitate illustration.

Figure 2 shows a dental film which has two independent exposable surfaces. In this figure, number 8 is a radio opaque sheet of metal, usually lead, that is of sufficient thickness to intercept and absorb the rays passing through the film package, during the exposure of one of the films 5, so that the film 5', on the opposite side of the lead will not be injured as a result of this exposure. To accomplish this, the sheet of metal 8, must be made heavier than is ordinarily employed in a film such as is illustrated in Figure 1. It being desirable to maintain the flexibility and thinness of the package and it being also necessary to protect the sensitive film on each side of the sheet of lead, this piece of lead 8, has been lacquered on both sides to give it a glossy harmless surface with which to contact the film.

The advantages of lacquering the radio opaque piece of metal instead of placing pieces of paper on one side or on each side of it for the necessary protection to the film, can still more readily be understood when the following figures are studied.

The minimum thickness of lead required for a film of the nature disclosed in Figure 2 is .008 inch. If two pieces of the finest paper available and in present use to give the necessary protection to the delicate film surface are used, they add not less than .008 inch to the thickness of the film packet and make the combined thickness of the lead and paper .016 inch. This adds considerably and noticeably to the bulk of the package.

When, however, this invention is carried out and both pieces of paper eliminated, the thickness of the lead with a coating of lacquer is only .0083 inch, two coats of lacquer having added only .0003 inch to the thickness of the package, an amount which is so negligible as to be practically unnoticed, thus adding no appreciable bulk to the X-ray film package.

It is believed that any one familiar with this art can appreciate the step forward in X-ray film packaging which is occasioned by this means whereby can be eliminated such a large percentage of the entire contents of the film package, both for greater ease in manufacture, and, what is more important, for the greater utility offered by a package making use of the disclosed invention.

In compliance with the requirements of the patent statutes, I have herein shown a number of preferred embodiments of my invention. It is, however, to be understood that the invention is not limited to the precise structures here shown, the same being merely illustrative of the principles of my invention.

What I consider new and desire to secure by Letters Patent is as follows:

1. In an X-ray film package an X-ray film and an X-ray opaque metal member adjacent to one side of the film, a lacquered surface on that side of the said member next to the film, and a light proof wrapper around the sheet and film.

2. In an X-ray film package a sheet of metal foil lacquer varnished on each side and X-ray sensitive film on each side of said foil, and a light proof, X-ray transparent wrapping around the films and foil.

3. An X-ray film package including a sheet of metal foil, which sheet has been lacquer varnished on the surfaces next to the film.

JACOB A. SAFFIR.